US012320588B2

(12) United States Patent
Li et al.

(10) Patent No.: US 12,320,588 B2
(45) Date of Patent: Jun. 3, 2025

(54) EFFICIENT AND ENERGY-SAVING SYSTEM AND PROCESS FOR RECYCLING WASTE HEAT OF PRODUCTION, AND METHOD FOR LARGE-SCALE PRODUCTION OF SILICA GEL

(71) Applicant: Qingdao Meigao Group Co., Ltd., Qingdao (CN)

(72) Inventors: Yongzhao Li, Qingdao (CN); Binjie Li, Qingdao (CN)

(73) Assignee: QINGDAO MEIGAO GROUP CO., LTD., Qingdao (CN)

( * ) Notice: Subject to any disclaimer, the term of this patent is extended or adjusted under 35 U.S.C. 154(b) by 0 days.

(21) Appl. No.: 18/818,719

(22) Filed: Aug. 29, 2024

(65) Prior Publication Data

US 2025/0155194 A1   May 15, 2025

(30) Foreign Application Priority Data

Nov. 14, 2023   (CN) .......................... 202311515550.2

(51) Int. Cl.
  *F26B 23/00*   (2006.01)
  *C01B 33/142*   (2006.01)
  *C01B 33/158*   (2006.01)

(52) U.S. Cl.
  CPC .......... *F26B 23/004* (2013.01); *C01B 33/142* (2013.01); *C01B 33/158* (2013.01)

(58) Field of Classification Search
  CPC .... F26B 23/004; C01B 33/142; C01B 33/158
  USPC ..................... 34/62; 423/338, 339
  See application file for complete search history.

(56) References Cited

U.S. PATENT DOCUMENTS

| 4,581,829 A * | 4/1986 | Becker .................... F26B 11/16 |
| | | 34/514 |
| 2013/0125412 A1* | 5/2013 | Haarlemmer ........... F26B 3/205 |
| | | 34/477 |

FOREIGN PATENT DOCUMENTS

| CN | 101074846 A | 11/2007 |
| CN | 102765724 A | 11/2012 |
| CN | 103332840 A | 10/2013 |
| CN | 104150732 A | 11/2014 |
| CN | 105329959 A | 2/2016 |
| CN | 208055754 U | 11/2018 |
| CN | 111174556 A | 5/2020 |
| CN | 111994915 A | 11/2020 |
| JP | 2007021333 A | 2/2007 |

(Continued)

*Primary Examiner* — John P McCormack
(74) *Attorney, Agent, or Firm* — Bayramoglu Law Offices LLC

(57) ABSTRACT

An efficient and energy-saving system for recycling waste heat of production includes a wet-steam waste-heat recycling module configured to recycle heat of a hot and wet steam produced during a drying process of a material, where the wet-steam waste-heat recycling module includes a conveyor belt configured to carry the material, a plurality of dryers, a compressor, and/or a heat exchanger. The conveyor belt passes through the plurality of dryers in sequence, each of the dryers is connected to the compressor and/or the heat exchanger through a pipeline, and the hot and wet steam produced by the compressor and/or the heat exchanger is reused for drying the material. A process for recycling waste heat of production is further provided. A method for large-scale production of silica gel allows the formation of an eco-friendly cycle during silica gel production, does not involve the emission of (waste gas, waste water and waste residues.

11 Claims, 8 Drawing Sheets

(56) References Cited

FOREIGN PATENT DOCUMENTS

| | | |
|---|---|---|
| KR | 20000001500 A | 1/2000 |
| WO | 2008117995 A1 | 10/2008 |

\* cited by examiner

EFFICIENT AND ENERGY-SAVING SYSTEM AND PROCESS FOR RECYCLING WASTE HEAT OF PRODUCTION, AND METHOD FOR LARGE-SCALE PRODUCTION OF SILICA GEL

CROSS REFERENCE TO THE RELATED APPLICATIONS

This application is based upon and claims priority to Chinese Patent Application No. 202311515550.2, filed on Nov. 14, 2023, the entire contents of which are incorporated herein by reference.

TECHNICAL FIELD

The present disclosure relates to the field of silica gel production, and in particular to an efficient and energy-saving system and process for recycling waste heat of production, and a method for large-scale production of silica gel.

BACKGROUND

Silica gel is a silica xerogel with a three-dimensional spatial network structure. Silica gel is a porous material with a wide pore distribution range, a large specific surface area, a large number of silanol groups on a surface, and a specified activity, and these properties allow silica gel to serve as an important desiccant, adsorbent, catalyst, and catalyst support or the like. Silica gel is widely used in the industrial production in fields such as medical treatment, electronics, cosmetics, and food processing.

Main raw materials for a silica gel production process are sodium silicate and sulfuric acid. Silica gel is produced by a sol-gel method, then aged, cut, water-washed, and dried to obtain a finished silica gel product. In addition to the finished silica gel product, outputs of the whole production process include wet silica gel powder, dry silica gel powder, sodium sulfate-containing water, and wastewater. Currently, the wet silica gel powder and the dry silica gel powder are used as scraps or sold at low prices. Due to factors such as a concentration and a process cost, the recovery of the sodium sulfate-containing water has a high cost and leads to a recovered material with a low value, and thus the sodium sulfate-containing water is inevitably discharged as wastewater to a sewage treatment plant. The wastewater, such as water resulting from water-washing and condensate water, is also discharged as sewage directly to a sewage treatment plant. The Chinese patent 201210121870.5 discloses a preparation method of silica gel, including: $NaHCO_3$ or $NH_4HCO_3$ as a raw material is allowed to react with sodium silicate $Na_2O \cdot nSiO_2$ to produce a $SiO_2$ hydrogel, and the hydrogel is molded, aged, and dried to obtain the silica gel. In this method, a recovered washing solution (or a filtrate) mainly includes $Na_2CO_3$ (or further includes $NH_3 \cdot H_2O$), and thus $CO_2$ can be introduced into the recovered washing solution to allow a reaction to re-produce the raw material. Therefore, in addition to a silicon source, other chemicals can be recycled. Compared with the prior art, the preparation method of this patent reduces a raw material cost for silica gel to some extent, and solves the problem that acid-containing and salt-containing wastewater is produced to cause environmental pollution. However, the technical solution of this patent is merely feasible theoretically. On one hand, because carbon dioxide is added to wastewater, the cost will be very high. On the other hand, the amounts of raw materials and the yield of the product in this patented technology are merely involved in a laboratory stage. The weak acid has a poor reaction effect, and thus cannot meet the needs of large-scale production of silica gel.

Sodium silicate, solid sodium silicate, has a molecular formula of $Na_2O \cdot nSiO_2$, where n is a modulus, which refers to a molar ratio of $SiO_2$ to $Na_2O$ and is generally 1.5 to 3.5. The larger the sodium silicate modulus, the more difficult for the solid sodium silicate to be dissolved in water. When n is 1, the solid sodium silicate can be dissolved in room-temperature water. When n increases, hot water is required to dissolve the solid sodium silicate. When n is greater than 3, a steam with 4 atmospheres or more is required to dissolve the solid sodium silicate. The larger the sodium silicate modulus, the higher the silicon oxide content and the larger the viscosity of sodium silicate, which makes it prone to decomposition, hardening, and adhesion increasing. Sodium silicate, as the most upstream product of an industrial chain, is often used as a basic chemical raw material to produce other downstream products, and is also an important raw material for silica gel production.

Production processes for sodium silicate include dry processes and wet processes. The dry processes include a soda ash process and a sodium sulfate process. The soda ash process is as follows: quartz sand and soda ash are mixed in a specified ratio and then heated to about 1,400° C. in a reverberatory furnace to produce molten sodium silicate. The wet processes include a caustic soda process. The caustic soda process is as follows: quartz sand (powder) and caustic soda as raw materials are allowed to react with a 0.6 MPa to 1.0 MPa steam in an autoclave to directly produce liquid sodium silicate. Among the above production processes, the soda ash process is usually adopted in the prior art. However, the soda ash process leads to the emission of more than 137 kg of $CO_2$ per ton of a product, which affects the ecological environment. The sodium sulfate process has a lower sodium silicate production cost than the soda ash process and the caustic soda process and thus is favored by enterprises. However, the sodium sulfate process is faced with the following problems: 1. There is heavy environmental pollution, and the existing desulfurization treatment has a poor effect. For example, when Glauber's salt (anhydrous sodium sulfate) is used to produce sodium silicate, sodium sulfate undergoes a chemical reaction with quartz sand during a production process to produce a large amount of a sulfur dioxide gas. During this production process, a large amount of $SO_2$ will be produced, and more than 200 kg of $SO_2$ will be emitted per ton of a product, which is 130 times an emission of the soda ash process and causes heavy environmental pollution. In the prior art, it attempts to conduct a desulfurization treatment by alkali liquor absorption, catalysis, and ammonia water absorption. However, a desulfurization efficiency is not high, an input is not proportional to an output economically, and a concentration of sulfur dioxide after the treatment is far from an emission standard. Even if sulfur dioxide is neutralized into a sulfate and sulfite, the emission also causes the waste of resources. 2. Due to a severe acidic atmosphere in a reverberatory furnace for a reaction, refractory bricks are seriously corroded, and a furnace age is only 4 to 6 months. In addition, due to the constraints of legal provisions for environmental protection, the technological development of the sodium sulfate process is restricted. The production of sodium silicate by the sodium sulfate process has been abandoned in the prior art.

The traditional sulfuric acid production process is as follows: sulfur or a pyrite is placed in an incinerator and oxygen-rich air is introduced into the incinerator for combustion to produce a sulfur dioxide-containing gas, the sulfur dioxide-containing gas is subjected to dust removal and then transferred into a converter together with an appropriate amount of air, sulfur dioxide is converted into sulfur trioxide under an action of a vanadium catalyst, and sulfur trioxide is finally absorbed with dilute sulfuric acid to produce sulfuric acid. However, the oxygen-rich air required during the production process needs to be supplied by an air separation device. The Chinese patent CN202010888165.2 discloses a method and apparatus for producing sodium silicate and sulfuric acid with a high-sulfur salt. The method is as follows: a sulfur-containing industrial salt mixture and silica undergo oxygen-fuel combustion to prepare sodium silicate, and a sulfur-containing flue gas generated during the preparation is subjected to heat exchange, dust removal, conversion, and absorption to produce sulfuric acid. However, in the production scenario of the technical solution of the patent, in order to allow the continuous steady-state acid production, the oxygen-fuel combustion provided by an air separation device must be adopted, and such a design increases the cost of the production input.

In addition, the waste heat generated during sodium silicate production and the waste heat generated during silica gel production are very valuable heat resources, and there is no waste heat recycling system specifically for sodium silicate production and silica gel production in the prior art.

Therefore, the problems in the prior art need to be solved urgently.

SUMMARY

In view of the deficiencies in the prior art, an objective of the present disclosure is to provide an efficient and energy-saving system and process for recycling waste heat of production, and a method for large-scale production of silica gel. Based on the above-mentioned problems, the present disclosure provides an efficient and energy-saving system and process for recycling waste heat of production, and a method for large-scale production of silica gel. The present disclosure allows the formation of an eco-friendly cycle during silica gel production, does not involve the emission of the "three wastes" (waste gas, waste water, and waste residues), allows the circulation of sulfur, sodium and silicon and the circulation of water resources and heat resources, is efficient and energy-saving, and is suitable for large-scale industrial production.

The technical solutions of the present disclosure are implemented as follows:

An efficient and energy-saving system for recycling waste heat of production is provided, including a wet-steam waste-heat recycling module configured to recycle heat of a hot and wet steam produced during a drying process of a material, where the wet-steam waste-heat recycling module includes a conveyor belt configured to carry the material, dryers, a compressor, and/or a heat exchanger; and the conveyor belt passes through a plurality of dryers in sequence, each of the dryers is connected to the compressor and/or the heat exchanger through a pipeline, and the hot and wet steam produced by the compressor and/or the heat exchanger is reused for drying the material.

According to the efficient and energy-saving system for recycling waste heat of production, the wet-steam waste-heat recycling module specifically includes a preheating conveyor belt, a first dryer, a second dryer, a third dryer, a first compressor, and a first heat exchanger; and the preheating conveyor belt passes through the first dryer, the second dryer and the third dryer in sequence, each of the preheating conveyor belt, the first dryer and the second dryer is connected to the first compressor through a pipeline, and each of the second dryer and the third dryer is connected to the first heat exchanger through a pipeline.

According to the efficient and energy-saving system for recycling waste heat of production, the system further includes a flue-gas waste-heat recycling module configured to recycle heat of a high-temperature flue gas produced during the production; the flue-gas waste-heat recycling module includes a waste heat boiler, a second heat exchanger, and a first heat pump; an inlet end of the waste heat boiler is connected to a reverberatory furnace and a sulfur-burning furnace that produce the high-temperature flue gas; an outlet end of the waste heat boiler is connected to a medium-temperature flue-gas inlet end of the second heat exchanger; a high-temperature air outlet end of the second heat exchanger is connected to the reverberatory furnace and the sulfur-burning furnace, respectively; a flue-gas outlet end of the second heat exchanger is connected to the first heat pump; the first heat pump is externally connected to room-temperature air and tap water; and a medium-temperature air outlet end of the first heat pump is connected to the second heat exchanger.

According to the efficient and energy-saving system for recycling waste heat of production, the system further includes a first wastewater waste-heat recycling module configured to recycle heat generated during a raw material preparation process; and the first wastewater waste-heat recycling module includes a cooler, and tap water or wastewater of a salt recovery device flows through the cooler for heating and then flows to a water-washing device.

According to the efficient and energy-saving system for recycling waste heat of production, the system further includes a second wastewater waste-heat recycling module configured to recycle heat generated during a salt recovery process; the second wastewater waste-heat recycling module includes a second heat pump and a mixing heater; and the second heat pump is connected to the water-washing device through a pipeline, and the water-washing device is connected to the mixing heater through a pipeline.

According to the efficient and energy-saving system for recycling waste heat of production, the system further includes a third wastewater waste-heat recycling module configured to recycle heat generated during a silica gel drying process.

Based on the same inventive concept, the present disclosure provides an efficient and energy-saving process for recycling waste heat of production, where the process adopts the system for recycling waste heat of production described above for heat recycling, and includes the following procedure:

a hot-and-wet steam heat recycling procedure: placing a wet material on the conveyor belt, and conveying the wet material by the conveyor belt to pass through the plurality of dryers in sequence, such that the material is dried by the plurality of dryers to produce a dry material; and connecting the conveyor belt and the dryers to the compressor and/or the heat exchanger through a pipeline, and reusing the hot and wet steam generated by the compressor and/or the heat exchanger for drying the material.

Further, the process also includes a flue-gas heat recycling procedure: allowing high-temperature flue gases produced by the reverberatory furnace and the sulfur-burning furnace to enter the waste heat boiler such that heat in the high-temperature flue gases is recovered by the waste heat boiler to produce medium-temperature flue gases, and allowing the medium-temperature flue gases to enter the second heat exchanger to undergo a heat exchange; allowing the first heat pump to recover flue-gas heat discharged by the second heat exchanger; heating tap water with one part of the flue-gas heat for water-washing; heating room-temperature air with the other part of the flue-gas heat to produce medium-temperature air, and allowing the medium-temperature air to enter the second heat exchanger to undergo a heat exchange with a medium-temperature flue gas to produce a low-temperature flue gas and high-temperature air, where the low-temperature flue gas enters the first heat pump and is further cooled, and the high-temperature air is used for combustion-supporting in the reverberatory furnace and the sulfur-burning furnace.

Further, the process also includes a first wastewater heat recycling procedure: recovering heat resulting from concentrated sulfuric acid dilution and sodium silicate dissolution by the cooler to heat tap water and frozen crystal water for water-washing.

Further, the process also includes a second wastewater heat recycling procedure: allowing sodium sulfate-containing water produced during water-washing to flow through the second heat pump, such that wastewater heat discharged during the water-washing is further recovered by the second heat pump.

Further, the process also includes a third wastewater heat recycling procedure: collecting condensate water produced by the first dryer and the second dryer for water-washing or heat supply.

Based on the same inventive concept, the present disclosure also provides a method for large-scale production of silica gel, where the method adopts the efficient and energy-saving process for recycling waste heat of production described above and includes the following steps:

S1: subjecting a silicon source, a sodium salt, and a sulfur-containing fuel in a specified ratio to a reaction at a specified reaction temperature to produce sodium silicate and a sulfur dioxide-rich flue gas;

S2: adding sulfur, introducing an appropriate amount of air, and conducting combustion to obtain a flue gas with a specified sulfur dioxide concentration; allowing the flue gas to enter an acid-washing and purification section for purification and drying, and then to enter a converter for catalytic conversion to produce sulfur trioxide; and finally absorbing the sulfur trioxide with concentrated sulfuric acid to obtain industrial-grade sulfuric acid; and S3: subjecting the sodium silicate produced in the step S1 and the sulfuric acid produced in the step S2 to solution preparation, gelatinization, aging, cutting, water-washing and drying to produce dry silica gel, where during a silica gel drying process, heat of a hot and wet steam is recycled for drying a material by the system for recycling waste heat of production described above. Further, during a water-washing process, the system for recycling waste heat of production described above is used to recycle heat of a flue gas for heating water to be used for water-washing, for heating water into a water vapor for reuse, and for heating air to allow combustion-supporting in the reverberatory furnace and the sulfur-burning furnace. Further, during a water-washing process, the system for recycling waste heat of production described above can also be used to allow first wastewater heat recycling for heating water to be used for water-washing. Further, during a water-washing process, the system for recycling waste heat of production described above can also be used to conduct second wastewater heat recycling for heating water to be used for water-washing or for heating water to be used for heat supply. Further, during a water-washing process, the system for recycling waste heat of production described above can also be used to conduct third wastewater heat recycling for heating water to be used for water-washing or for heating water to be used for heat supply.

According to the method for large-scale production of silica gel described above, the silicon source in the step S1 is selected from any of the following: (a1) quartz sand; (a2) dry silica gel powder produced during a dry silica gel production procedure; (a3) wet silica gel powder produced during an aging and cutting procedure; (a4) an alkali sludge resulting from filtration and precipitation during solution preparation of the sodium silicate; and (a5) a polysilicon residue.

According to the method for large-scale production of silica gel described above, the sodium salt in the step S1 is selected from any of the following: (b1) sodium sulfate decahydrate produced after desalination of sodium sulfate-containing water during a water-washing procedure; (b2) anhydrous sodium sulfate produced after the desalination of the sodium sulfate-containing water during the water-washing procedure; (b3) a sulfur-containing solid-waste sodium salt: sodium thiosulfate, sodium thiocyanate, and sodium sulfite; and (b4) a water-quenching solution produced in a water-quenching tank during a sodium silicate production procedure.

According to the method for large-scale production of silica gel described above, water adopted for the water-washing procedure in the step S3 is selected from any one or more of the following: (c1) wastewater produced after the water-washing and treated; (c2) water produced after condensation of a steam produced during the silica gel drying process; (c3) condensate water produced by the sulfur-burning furnace and the waste heat boiler; (c4) cooled water produced by the sulfur-burning furnace and the waste heat boiler in the step S1; (c5) cooling water produced during solution preparation of the sulfuric acid; and (c6) aging water produced during an aging and cutting procedure.

According to the method for large-scale production of silica gel described above, the sulfur-containing fuel in the step S1 is high-sulfur coal or high-sulfur petroleum coke powder.

Compared with the prior art, the present disclosure has the following advantages and beneficial effects:

1. With the efficient and energy-saving system for recycling waste heat of production provided by the present disclosure, a hot and wet steam during a silica gel drying process is treated and then returned to a dryer or a preheating conveyor belt for drying silica gel once again to allow the recycling of heat resources, which is efficient and energy-saving.

2. The efficient and energy-saving system for recycling waste heat of production provided by the present disclosure further includes a flue-gas waste-heat recycling module. The flue-gas waste-heat recycling module can recover heat of a high-temperature flue gas produced by a reverberatory furnace and a sulfur-burning furnace to heat water into a water vapor for utilization, heat air, and heat water, which makes full use of a heat resource of the flue gas, reduces the energy consumption, and saves the cost.

3. The efficient and energy-saving system for recycling waste heat of production provided by the present disclosure further includes a first wastewater waste-heat recycling module configured to recycle heat generated during a raw material preparation process. The first wastewater waste-heat recycling module can cool high-temperature liquid sodium silicate to a low temperature and recover heat for heating tap water or frozen water, and can cool diluted high-temperature dilute sulfuric acid to a low temperature and recover heat for heating tap water or frozen water, which makes full use of the heat resources generated during the raw material preparation process. In addition, the heat recovery makes a temperature during gelatinization not too high, which avoids an uneven reaction.

4. The efficient and energy-saving system for recycling waste heat of production provided by the present disclosure further includes a second wastewater waste-heat recycling module configured to recycle heat generated during a salt recovery process. The second wastewater waste-heat recycling module can treat water produced during the salt recovery process and use treated water for water washing, and can further recycle wastewater heat discharged during a water-washing process, which saves the heat sources and cost.

5. The efficient and energy-saving system for recycling waste heat of production provided by the present disclosure further includes a third wastewater waste-heat recycling module configured to recycle heat generated during a silica gel drying process. The third wastewater waste-heat recycling module can recycle condensate water produced by a dryer, which saves the heat sources.

6. The efficient and energy-saving process for recycling waste heat of production provided by the present disclosure has a low energy consumption as a whole, can produce steams with different temperatures, and has a wide application range.

7. The method for large-scale production of silica gel provided by the present disclosure can recycle silicon, sodium, sulfur, and water, recover all waste heat and waste gases to the maximum extent, reduces the emission of waste gases and wastewater, and allows the zero emission of carbon and sulfur, which can protect the environment. The entire production allows the circulation of materials and energy, reduces the energy consumption, and saves the production cost, which enables the large-scale production of silica gel.

BRIEF DESCRIPTION OF THE DRAWINGS

To describe the technical solutions in the present disclosure or in the prior art clearly, the accompanying drawings required for describing the embodiments or the prior art are briefly described below. Apparently, the following description shows merely an embodiment of the present disclosure, and a person of ordinary skill in the art may still derive other accompanying drawings from these accompanying drawings without creative efforts.

Figure 1:
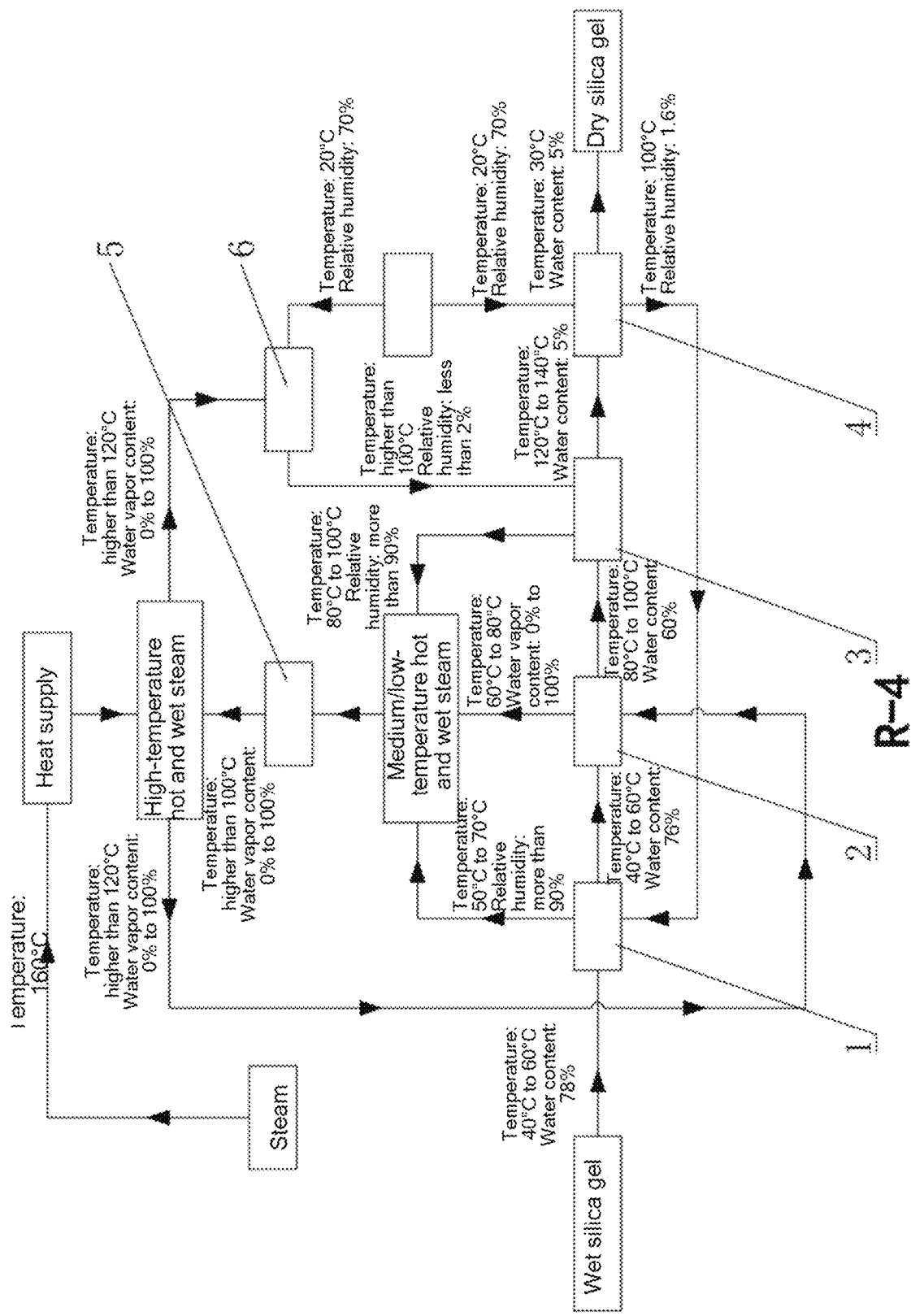
FIG. 1 is a schematic flow chart of the wet-steam waste-heat recycling module provided by the present disclosure.

In the figures: 1: a preheating conveyor belt, 2: a first dryer, 3: a second dryer, 4: a third dryer, 5: a first compressor, 6: a first heat exchanger, 7: a waste heat boiler, 8: a second heat exchanger, 9: a first heat pump, 10: a reverberatory furnace, 11: a water-quenching tank, 12: a sulfur-burning furnace, 13: a water-washing device, 14: an alkali cooler, 15: an acid cooler, 16: a second heat pump, and 17: a mixing heater.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An efficient and energy-saving system for recycling waste heat of production is provided, including a wet-steam waste-heat recycling module configured to recycle heat of a hot and wet steam produced during a drying process of a material. The wet-steam waste-heat recycling module includes a conveyor belt configured to carry the material, dryers, a compressor, and/or a heat exchanger. The conveyor belt passes through a plurality of dryers in sequence, each of the dryers is connected to the compressor and/or the heat exchanger through a pipeline, and the hot and wet steam produced by the compressor and/or the heat exchanger is reused for drying the material. In the present disclosure, the dryers each are any one of a compartment dryer, a conveyor dryer, a drum dryer, a vertical dryer, a mechanical agitation dryer, a rotary dryer, a fluidized bed dryer, a pneumatic dryer, a vibrating dryer, a spray dryer, a mesh belt dryer, and an air-cooling dryer. The compressor includes, but is not limited to, any one of a piston compressor, a screw compressor, a centrifugal compressor, a linear compressor, a scroll compressor, and a Roots compressor. The heat exchanger is any one of a jacketed heat exchanger, an immersed coil heat exchanger, a spray heat exchanger, a double-pipe heat exchanger, a plate heat exchanger, a shell and tube heat exchanger, a double-pipe plate heat exchanger, a mixing heat exchanger, a regenerative heat exchanger, a fluid-connection indirect heat exchanger, a gas-to-gas heat exchanger, a direct contact heat exchanger, and a recuperative heat exchanger. In the present disclosure, the material is silica gel.

The waste heat generated during sodium silicate production and the waste heat generated during silica gel production are very valuable heat resources, and there is no waste heat recycling system specifically for sodium silicate production and silica gel production in the prior art. With the efficient and energy-saving system for recycling waste heat of production provided by the present disclosure, a hot and wet steam produced during a silica gel drying process can be treated by the compressor or the heat exchanger, where a medium/low-temperature hot and wet steam is compressed by the compressor to produce hot and wet steams suitable for silica gel drying and the hot and wet steams are reused for drying silica gel, or a high-temperature hot and wet steam is subjected to a heat exchange with air in the heat exchanger to produce a hot and wet steam suitable for silica gel drying and the hot and wet steam is reused for drying silica gel. In the present disclosure, the medium/low-temperature hot and wet steam refers to steams with a temperature of 50° C. to 100° C. and a water mass percentage content of 0% to 100%. The high-temperature hot and wet steam refers to a steam with a temperature of higher than 100° C. and a water mass percentage content of 0% to 100%.

As shown in FIG. 1, in a preferred embodiment of the present disclosure, the wet-steam waste-heat recycling module specifically includes a preheating conveyor belt, a first dryer, a second dryer, a third dryer, a first compressor, and a first heat exchanger. Each of the dryers is connected to the compressor and the heat exchanger through a first pipeline, P1. The preheating conveyor belt passes through the first dryer, the second dryer and the third dryer in sequence, each of the preheating conveyor belt, the first dryer and the second dryer is connected to the first compressor through a second pipeline, P2, and each of the second dryer and the third dryer is connected to the first heat exchanger through a third pipeline, P3.

Preferably, the first dryer is a vertical dryer, the second dryer is a mesh belt dryer, and the third dryer is an air-cooling dryer. The first compressor is a centrifugal compressor and specifically a steam-recompression compressor. The first heat exchanger is a gas-to-gas heat exchanger. Preferably, the preheating conveyor belt refers to a conveyor belt in which a heating device is provided, and can preheat silica gel during a conveying process. In the present disclosure, the preheating of low-temperature wet silica gel in advance in the preheating conveyor belt can improve a quality of a product, shorten a time of drying, improve a drying effect for silica gel, and improve a yield of silica gel.

Figure 2:
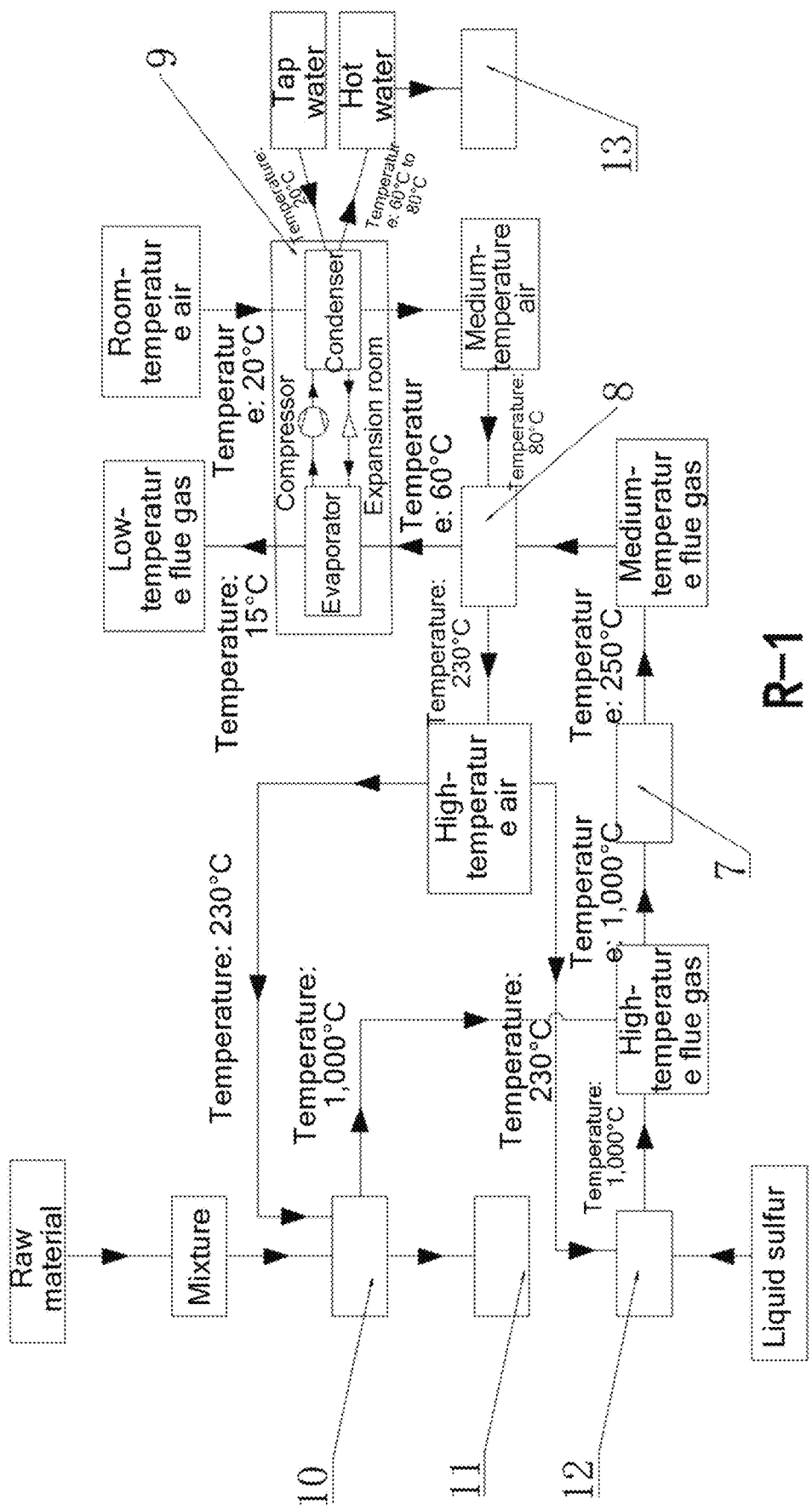
FIG. 2 is a schematic flow chart of the flue-gas waste-heat recycling module provided by the present disclosure.

As shown in FIG. 2, preferably, the efficient and energy-saving system for recycling waste heat of production further includes a flue-gas waste-heat recycling module configured to recycle heat of a high-temperature flue gas produced during the production. The flue-gas waste-heat recycling module includes a waste heat boiler, a second heat exchanger, and a first heat pump. A flue-gas inlet end of the waste heat boiler is connected to a sulfur-burning furnace and a reverberatory furnace that produce the high-temperature flue gas. The high-temperature flue gas here refers to "a flue gas with a temperature of higher than or equal to 1,000° C.". A flue-gas outlet end of the waste heat boiler is connected to a medium-temperature flue-gas inlet end of the second heat exchanger. The medium-temperature flue gas here refers to "a flue gas with a temperature of 230° C. to 250° C.". A high-temperature air outlet end of the second heat exchanger is connected to the reverberatory furnace and the sulfur-burning furnace, respectively. The high-temperature air here refers to "air with a temperature of 230° C. to 250° C.". A flue-gas outlet end of the second heat exchanger is connected to the first heat pump. A flue gas at the outlet end of the second heat exchanger has a temperature of 60° C., and undergoes a heat exchange by the first heat pump to produce a low-temperature flue gas. The low-temperature flue gas here refers to "a flue gas with a temperature of 10° C. to 35° C.". The first heat pump is externally connected to room-temperature air and tap water. The room-temperature air here refers to "air with a temperature of 20° C. to 25° C.". A medium-temperature air outlet end of the first heat pump is connected to the second heat exchanger. The medium-temperature air here refers to "air with a temperature of 70° C. to 90° C.". Preferably, the second heat exchanger is a gas-to-gas heat exchanger. The flue-gas waste-heat recycling module is mainly configured to recover flue-gas heat in the sulfur-burning furnace and the reverberatory furnace and reuse the recovered flue-gas heat for production of sodium silicate, combustion in the sulfur-burning furnace, heating of water for a water-washing device, heating of water into a water vapor, or the like.

In a preferred embodiment of the present disclosure, waste heat in a flue gas is collected by the waste heat boiler, pretreated, sent to the waste heat boiler for heating or evaporation, and then transferred through the second heat exchanger to another medium such as air to reach a predetermined temperature or pressure. In the process of the present disclosure, heat of a high-temperature flue gas produced by the reverberatory furnace and the sulfur-burning furnace is recovered by the waste heat boiler to heat water into a water vapor for utilization. The second heat exchanger can allow the energy transfer between two gases with different temperatures, such that a cold gas entering the second heat exchanger is heated and a hot gas is cooled. In the process of the present disclosure, the second heat exchanger recovers flue-gas heat discharged from the waste heat boiler to heat air, that is, a medium-temperature flue gas and medium-temperature air are subjected to a heat exchange to produce high-temperature air and a flue gas with a reduced temperature. The first heat pump is a device that transfers heat in a low-temperature heat source to a high-temperature heat source, and is also a mechanical device that forces heat to flow from a low-temperature object to a high-temperature object in a reversed Carnot cycle mode. With the first heat pump, a large heat supply can be obtained with merely a small consumption of reversed cycle network. In the process of the present disclosure, flue-gas heat discharged from the second heat exchanger is further recovered to heat water and air, that is, a flue gas with a reduced temperature from the second heat exchanger undergoes further heat recovery by the first heat pump to produce a low-temperature flue gas, room-temperature air is treated by the first heat pump to produce medium-temperature air, and tap water is treated by the first heat pump to produce hot water that can be used for water-washing.

Preferably, the efficient and energy-saving system for recycling waste heat of production further includes a first wastewater waste-heat recycling module configured to recycle heat generated during a raw material preparation process. The first wastewater waste-heat recycling module includes a cooler, and tap water or wastewater of a salt recovery device flows through the cooler for heating and then flows to a water-washing device.

Figure 3:
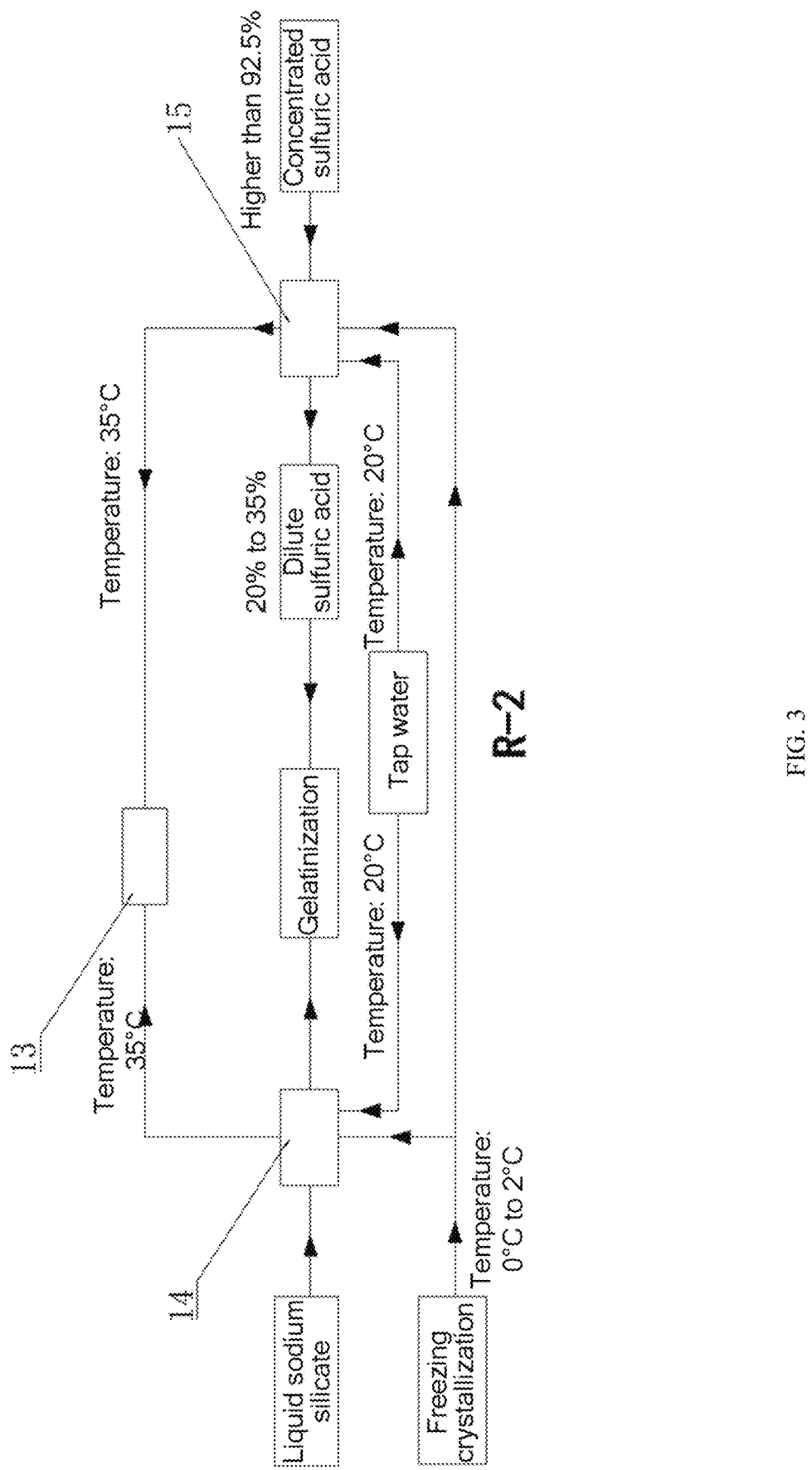
FIG. 3 is a schematic flow chart of the first wastewater waste-heat recycling module provided by the present disclosure.

As shown in FIG. 3, in a preferred embodiment of the present disclosure, the cooler includes an acid cooler and an alkali cooler. The acid cooler is a heat-exchange device made of an acid-resistant material. The acid cooler is configured to cool a fluid, and usually adopts water or air as a cooling agent to remove heat. In the process of the present disclosure, the acid cooler cools diluted high-temperature dilute sulfuric acid to a low temperature and uses corresponding heat to heat tap water or cooling water. The alkali cooler is a heat-exchange device made of an alkali-resistant material. The alkali cooler is configured to cool a fluid, and usually adopts water or air as a cooling agent to remove heat. In the process of the present disclosure, the alkali cooler cools high-temperature liquid sodium silicate to a low temperature and uses corresponding heat to heat tap water or cooling water. Tap water or cooling water heated by the acid cooler and the alkali cooler is used for water-washing of silica gel. For example, tap water at room temperature of 20° C. can be first heated by the acid cooler and the alkali cooler to 35° C., then heated to a water-washing temperature required by the process, and then used for water-washing. Wastewater produced after salt freezed crystallization has a temperature merely of 0° C. to 2° C., and the wastewater can be first heated by the acid cooler and the alkali cooler to 35° C., then heated to the water-washing temperature required by the process, and then used for water-washing.

Preferably, the efficient and energy-saving system for recycling waste heat of production further includes a second wastewater waste-heat recycling module configured to recycle heat generated during a salt recovery process. The second wastewater waste-heat recycling module includes a second heat pump and a mixing heater. The second heat pump is connected to the water-washing device through a fourth pipeline, P4, and the water-washing device is connected to the mixing heater through a fifth pipeline, P5. Wastewater produced by the water-washing device is cooled by the second heat pump and then flows to the salt recovery device. High-temperature wastewater of the salt recovery device, condensate water resulting from silica gel drying, and a high-temperature steam produced by the waste heat boiler are mixed in the mixing heater to undergo a heat exchange, and then flow to the water-washing device. The high-temperature wastewater here refers to "wastewater with a temperature of 40° C. to 95° C.", and the high-temperature steam here refers to "a steam with a temperature of 160° C.".

Figure 4:
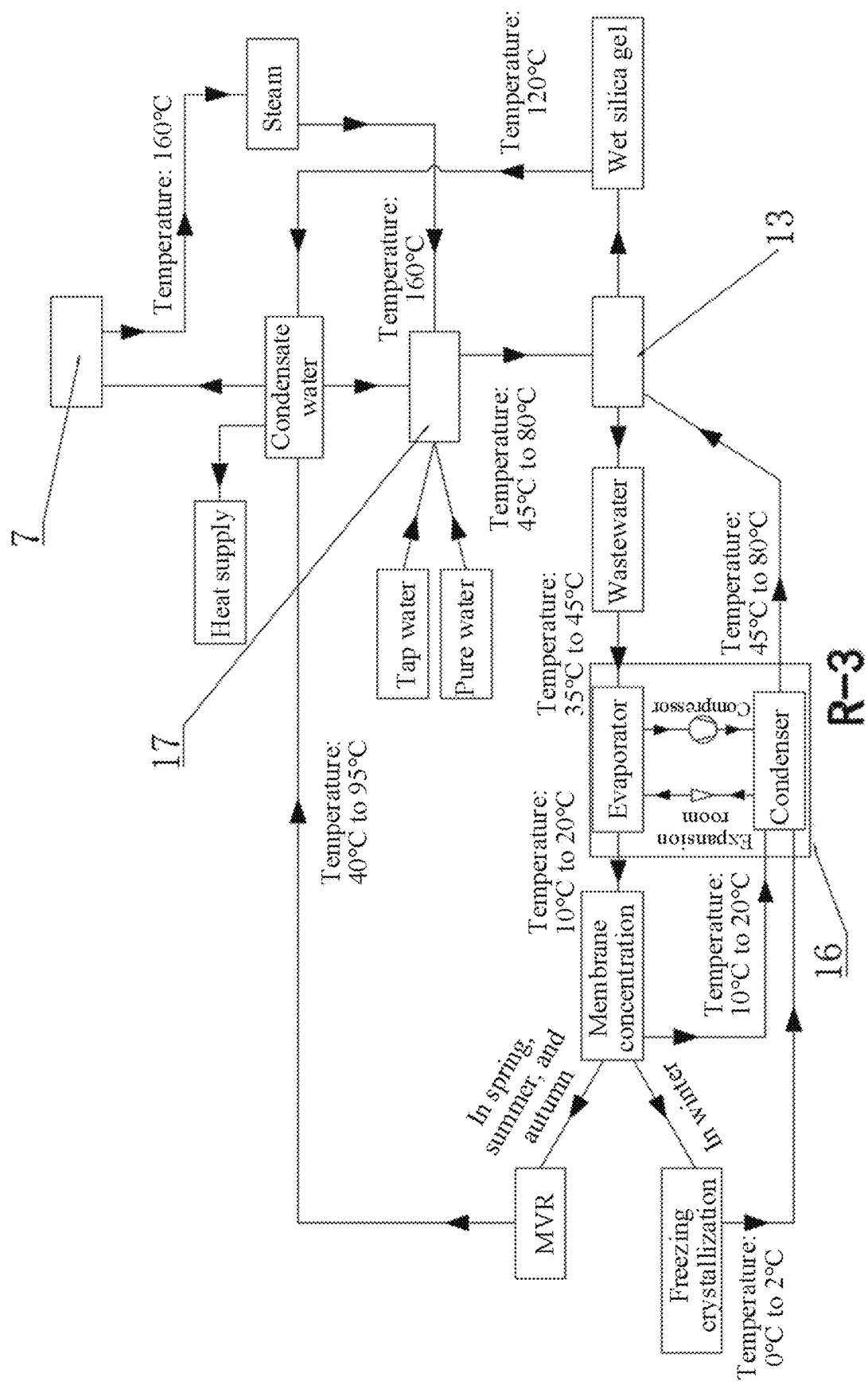
FIG. 4 is a schematic flow chart of the second wastewater waste-heat recycling module provided by the present disclosure.

As shown in FIG. 4, in a preferred embodiment of the present disclosure, sodium sulfate-containing water resulting from water-washing flows through the second heat pump, and the second heat pump further recovers heat of the wastewater discharged from the water-washing, such that, for example, wastewater with a temperature of 35° C. to 45° C. resulting from the water-washing becomes water with a temperature of 10° C. to 20° C. and then used for membrane concentration and wastewater with a temperature of 10° C. to 20° C. resulting from the membrane concentration becomes water with a temperature of 45° C. to 80° C. and then used for water-washing. Wastewater produced after heat recovery is treated by membrane concentration and desalination, and different desalination modes are adopted according to different seasons. In spring, summer, and autumn, a mechanical vapor recompression (MVR) mode is adopted, which is an energy-saving technology where the energy of a secondary steam produced by itself is reused to reduce the demand for external energy. In the process of the present disclosure, in spring, summer, and autumn, the MVR mode is adopted to subject a high-concentration salt solution produced after membrane concentration to evaporation and concentration to obtain sodium sulfate. In winter, a freezing crystallization mode is adopted, which is a process where different liquid components are separated by cooling a liquid to allow the supersaturated precipitation of crystals. In the process of the present disclosure, in winter, the freezing crystallization mode is adopted to crystallize sodium sulfate in a high-concentration salt solution produced after membrane concentration. Preferably, the mixing heater is a steam-water mixing heater, which is a heating device where a steam is directly mixed with water or another liquid, and is configured to heat water or another liquid directly with a steam. In the process of the present disclosure, a mixed steam of low-temperature tap water, pure water, condensate water, or the like is heated to a temperature required by the process. For example, the mixing heater mixes a 160° C. steam with tap water, pure water, condensate water resulting from MVR, or condensate water resulting from wet silica gel drying to produce water with a temperature of 45° C. to 80° C. for water-washing.

Preferably, the efficient and energy-saving system for recycling waste heat of production further includes a third wastewater waste-heat recycling module configured to recycle heat generated during a silica gel drying process.

Figure 5:
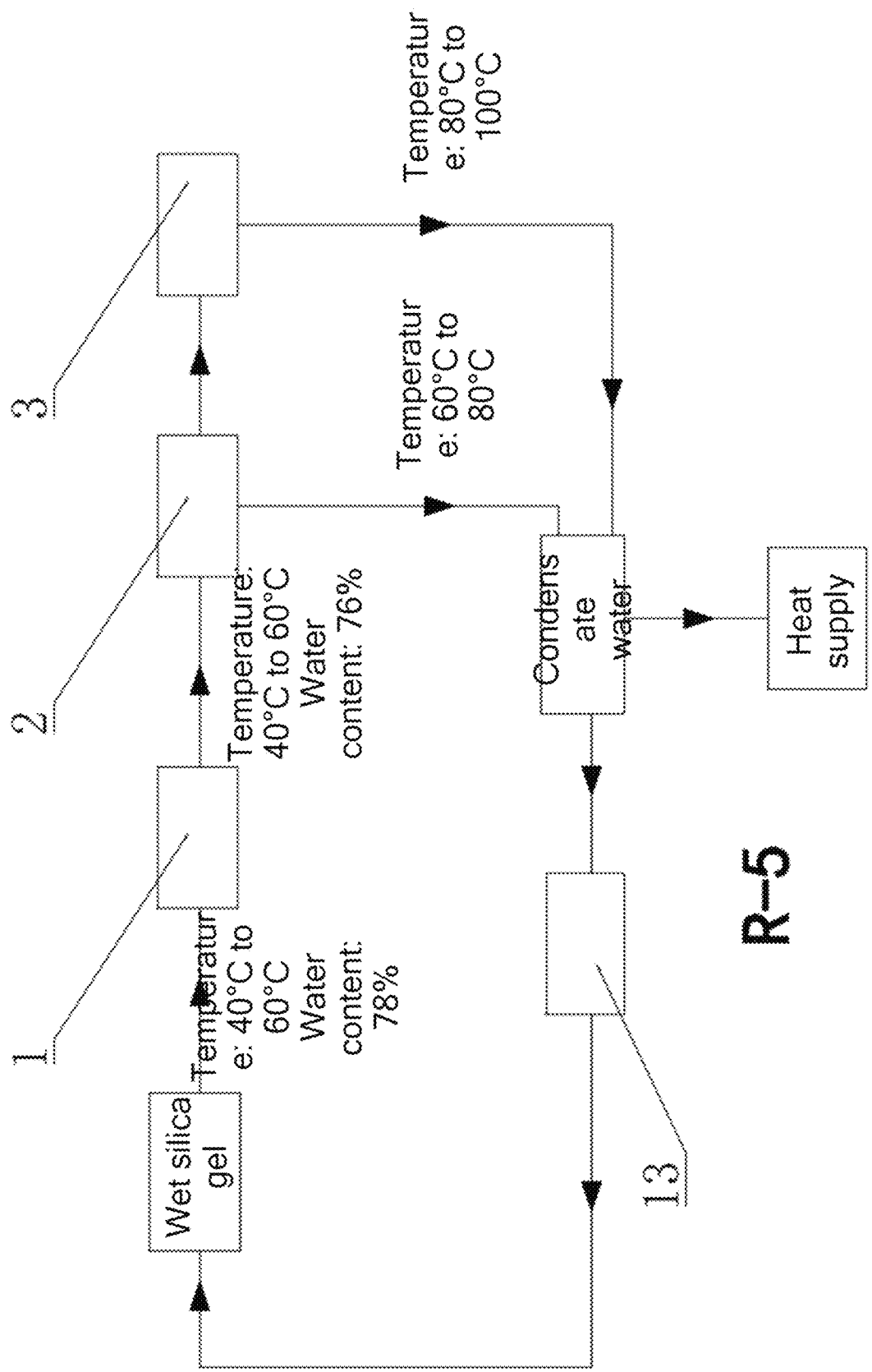
FIG. 5 is a schematic flow chart of the third wastewater waste-heat recycling module provided by the present disclosure.

As shown in FIG. 5, in a preferred embodiment of the present disclosure, the first dryer can produce condensate water, and the second dryer can also produce condensate water. The above two types of condensate water are collected. One part of collected condensate water can be reused for water-washing, and the other part of collected condensate water can be used for heat supply. For example, the first dryer can produce condensate water with a temperature of 60° C. to 80° C. and the second dryer can also produce condensate water with a temperature of 80° C. to 100° C.

The present disclosure provides an efficient and energy-saving process for recycling waste heat of production, where the process adopts the system for recycling waste heat of production described above for heat recycling, and includes the following procedure:

A hot-and-wet steam heat recycling procedure: A wet material is placed on the conveyor belt, and the wet material is conveyed by the conveyor belt to pass through the plurality of dryers in sequence, such that the material is dried by the plurality of dryers to produce a dry material. Each of the dryers is connected to the compressor and/or the heat exchanger through a pipeline, and the hot and wet steam generated by the compressor and/or the heat exchanger is reused for drying the material. Preferably, the conveyor belt is a preheating conveyor belt, and the preheating conveyor belt is connected to the compressor through a pipeline. Preferably, the material of the present disclosure is silica gel. Preferably, wet silica gel is placed on the preheating conveyor belt, and is conveyed by the preheating conveyor belt to the first dryer such that the silica gel is dried by the first dryer, then to the second dryer such that the silica gel is further dried by the second dryer, and then to the third dryer such that the silica gel is further dried by the third dryer to produce dry silica gel. The first compressor compresses a medium/low-temperature hot and wet steam produced by the preheating conveyor belt, the first dryer, and the second dryer to produce a high-temperature hot and wet steam. One part of the high-temperature hot and wet steam is delivered to the first dryer for silica gel drying and the other part of the high-temperature hot and wet steam is delivered to the first heat exchanger to undergo a heat exchange with air and then delivered to the second dryer for silica gel drying. A high-temperature hot and wet steam produced by the third dryer flows to the preheating conveyor belt for silica gel drying.

The water content mentioned in the present disclosure refers to a percentage of a weight of water in a substance to a total weight of the substance. The relative humidity mentioned in the present disclosure refers to a ratio of an actual water vapor pressure in air to a saturated water vapor pressure at the current air temperature. The relative humidity reflects a distance of air from saturated air, and represents a percentage of an absolute humidity in air to a saturated absolute humidity at the same temperature and air pressure, that is, a mass percentage of a water vapor in wet air to a water vapor in saturated air at the same temperature and air pressure. The water vapor content mentioned in the present disclosure refers to a percentage of a mass of a water vapor in wet air to a total mass of the wet air.

As shown in FIG. 1, preferably, the preheating conveyor belt carries wet silica gel with a temperature of 40° C. to 60° C. and a water content of 78%. Because the preheating conveyor belt has a heating effect and can play a specified drying role for the silica gel, a medium/low-temperature hot and wet steam with a temperature of 50° C. to 70° C. and a relative humidity of greater than 90% is produced and enters the first compressor for compression and heating, and the wet silica gel is dried from a water content of 78% to a water content of 76% and then enters the first dryer. Because the first dryer is a vertical dryer, the silica gel moves vertically downwards in the first dryer due to a weight of the silica gel itself. When falling, the silica gel is heated by a heating surface through which the silica gel passes, such that water in the silica gel is vaporized to allow first-stage silica gel drying and a medium/low-temperature hot and wet steam with a temperature of 60° C. to 80° C. and a water vapor content of 0% to 100% is produced and enters the first compressor for compression and heating. Silica gel with a temperature of 80° C. to 100° C. and a water content of 60% produced after the drying by the first dryer enters the second dryer. The second dryer is a drying device that adopts a steel mesh as a conveyor belt to carry silica gel for continuous drying, and the silica gel is evenly spread on a mesh belt by a feeder and driven by a driving device to move in the second dryer. The second dryer includes a plurality of units. A hot steam passes through silica gel spread on the mesh belt from bottom to top or from top to bottom for heat-drying to take away water. The mesh belt moves slowly, and a movement speed can be freely adjusted according to a temperature of silica gel. Dried silica gel continuously falls into a receiver, so as to allow two-stage silica gel drying. In this process, a medium/low-temperature hot and wet steam with a temperature of 80° C. to 100° C. and a relative humidity of greater than 90% is produced and enters the first compressor for compression and heating. Silica gel with a temperature of 120° C. to 140° C. and a water content of 5% produced after the drying by the second dryer enters the third dryer, and the third dryer cools the silica gel with room-temperature air to recover heat and reduce a temperature of the silica gel, which facilitates the subsequent packaging of a dry silica gel product and allows three-stage silica gel drying. In addition, air with a temperature of 20° C. and a relative humidity of 70% is supplied to the third dryer. Since the third dryer is an air-cooling dryer, hot air with a temperature of 100° C. and a relative humidity of 1.6% produced by the third dryer is reused for drying of silica gel on the preheating conveyor belt. The medium/low-temperature hot and wet steam with a temperature of 50° C. to 70° C. and a relative humidity of greater than 90% produced by the preheating conveyor belt, the medium/low-temperature hot and wet steam with a temperature of 60° C. to 80° C. and a water vapor content of 0% to 100% produced by the first dryer, and the medium/low-temperature hot and wet steam with a temperature of 80° C. to 100° C. and a relative humidity of greater than 90% produced by the second dryer enter the first compressor for compression and heating to produce a high-temperature hot and wet steam with a temperature of higher than 100° C. and a water vapor content of 0% to 100%, and the high-temperature hot and wet steam is subjected to a heat exchange with a steam having a temperature of 160° C. that is supplied. In the present disclosure, the steam having the temperature of 160° C. can come from the waste heat boiler. After the heat exchange, a high-temperature hot and wet steam with a temperature of higher than 120° C. is produced. One part of the high-temperature hot and wet steam is reused for silica gel drying in the first dryer, and the other part of the high-temperature hot and wet steam enters the first heat exchanger. The high-temperature hot and wet steam with a temperature of higher than 120° C. that enters the first heat exchanger is subjected to a heat exchange with room-temperature air having a temperature of 20° C. and a relative humidity of 70% that is supplied to produce a high-temperature hot and wet steam with a temperature of higher than 100° C. and a relative humidity of less than 2%, and the high-temperature hot and wet steam is reused for silica gel drying in the second dryer.

A flue-gas heat recycling procedure: High-temperature flue gases produced by the reverberatory furnace and the sulfur-burning furnace are allowed to enter the waste heat boiler such that heat in the high-temperature flue gases is recovered by the waste heat boiler to produce medium-temperature flue gases, and the medium-temperature flue gases are allowed to enter the second heat exchanger to undergo a heat exchange. Flue-gas heat discharged by the second heat exchanger is recovered by the first heat pump. One part of the flue-gas heat is used to heat tap water for water-washing in the water-washing device. The other part of the flue-gas heat is used to heat room-temperature air to produce medium-temperature air, and the medium-temperature air enters the second heat exchanger to undergo a heat exchange with a medium-temperature flue gas to produce a flue gas with a reduced temperature and high-temperature air. The flue gas with a reduced temperature enters the first heat pump and is further cooled to produce a low-temperature flue gas, and the high-temperature air is used for combustion-supporting in the reverberatory furnace and the sulfur-burning furnace.

Preferably, a high-temperature flue gas with a temperature of about 1,000° C. is produced by the reverberatory furnace and the sulfur-burning furnace and enters the waste heat boiler, heat in the high-temperature flue gas is recovered by the waste heat boiler to produce a medium-temperature flue gas with a temperature of 250° C., and then the medium-temperature flue gas enters the second heat exchanger to undergo a heat exchange. Flue-gas heat discharged by the second heat exchanger is recovered by the first heat pump. One part of the flue-gas heat is used to heat tap water for water-washing and the other part of the flue-gas heat is used to heat room-temperature air of 20° C. to produce medium-temperature air of 80° C. The medium-temperature air of 80° C. enters the second heat exchanger to undergo a heat exchange with a medium-temperature flue gas of 250° C. to produce a flue gas with a reduced temperature of 60° C. and high-temperature air of 230° C. The flue gas with the reduced temperature of 60° C. enters the first heat pump and is further cooled to produce a low-temperature flue gas of 15° C., and the high-temperature air of 230° C. is used for combustion-supporting during sodium silicate preparation in the reverberatory furnace and combustion-supporting for sulfur combustion in the sulfur-burning furnace.

A first wastewater heat recycling procedure: Heat resulting from concentrated sulfuric acid dilution and sodium silicate dissolution is recovered by the cooler to heat tap water and frozen crystal water for water-washing.

Preferably, the cooler includes an acid cooler configured to dilute concentrated sulfuric acid with a concentration of greater than 92.5% into dilute sulfuric acid with a concentration of 20% to 35% and an alkali cooler configured to dissolve solid sodium silicate. A large amount of heat is produced during the dilution or dissolution of the concentrated sulfuric acid and the solid sodium silicate before gelatinization. The acid cooler can cool diluted high-temperature dilute sulfuric acid to a low temperature and use corresponding heat to heat tap water with a temperature of 20° C. or frozen crystal water with a temperature of 0° C. to 2° C. to produce water with a temperature of 35° C. required by water-washing. The alkali cooler can cool high-temperature liquid sodium silicate to a low temperature and use corresponding heat to heat tap water with a temperature of 20° C. or frozen crystal water with a temperature of 0° C. to 2° C. to produce water with a temperature of 35° C. required by water-washing.

A second wastewater heat recycling procedure: Sodium sulfate-containing water produced during water-washing flows through the second heat pump, such that wastewater heat discharged during the water-washing is further recovered by the second heat pump.

Preferably, the sodium sulfate-containing water produced during the water-washing flows through the second heat pump, such that wastewater heat with a temperature of 35° C. to 45° C. discharged during the water-washing is further recovered by the second heat pump. Wastewater with a temperature of 10° C. to 20° C. produced after heat recovery is subjected to membrane concentration and desalination, and different desalination modes are adopted according to different seasons. In spring, summer, and autumn, the MVR mode is adopted. The MVR mode is adopted to subject a high-concentration salt solution produced after membrane concentration to evaporation and concentration to obtain sodium sulfate. In winter, the freezing crystallization mode is adopted. The freezing crystallization mode is adopted to crystallize sodium sulfate in a high-concentration salt solution produced after membrane concentration. The mixing heater can mix low-temperature tap water, pure water, condensate water, or the like with a steam of 160° C. for heating to a temperature required by water-washing. In the present disclosure, the steam of 160° C. comes from the waste heat boiler. One part of the steam of 160° C. is used for the second wastewater heat recycling procedure, and the other part of the steam of 160° C. is used for steam supply in the hot-and-wet steam heat recycling procedure.

A third wastewater heat recycling procedure: Condensate water produced by the first dryer and the second dryer is collected for water-washing or heat supply.

Preferably, the first dryer can produce condensate water with a temperature of 60° C. to 80° C., and the second dryer can also produce condensate water with a temperature of 80° C. to 100° C. The above two types of condensate water are collected. One part of collected condensate water can be reused for water-washing, and the other part of collected condensate water can be used for heat supply.

According to calculations based on an annual production capacity of 300,000 tons for silica gel, the wet-steam waste-heat recycling module can recycle 2800,000 GJ of heat, the flue-gas waste-heat recycling module can recycle 3,000,000 GJ of heat, the first wastewater waste-heat recycling module can recycle 195,000 GJ of heat, the second wastewater waste-heat recycling module can recycle 435,000 GJ of heat, and the third wastewater waste-heat recycling module can recycle 415,000 GJ of heat. The flue-gas waste-heat recycling module can recycle the most heat, accounting for 43.8% of the total recycled heat. The wet-steam waste-heat recycling module can recycle the second most heat, accounting for 40.9% of the total recycled heat. The heat recycled by the second wastewater waste-heat recycling module accounts for 6.4% of the total recycled heat. The heat recycled by the third wastewater waste-heat recycling module accounts for 6.1% of the total recycled heat. The heat recycled by the first wastewater waste-heat recycling module accounts for 2.8% of the total recycled heat.

Figure 6:
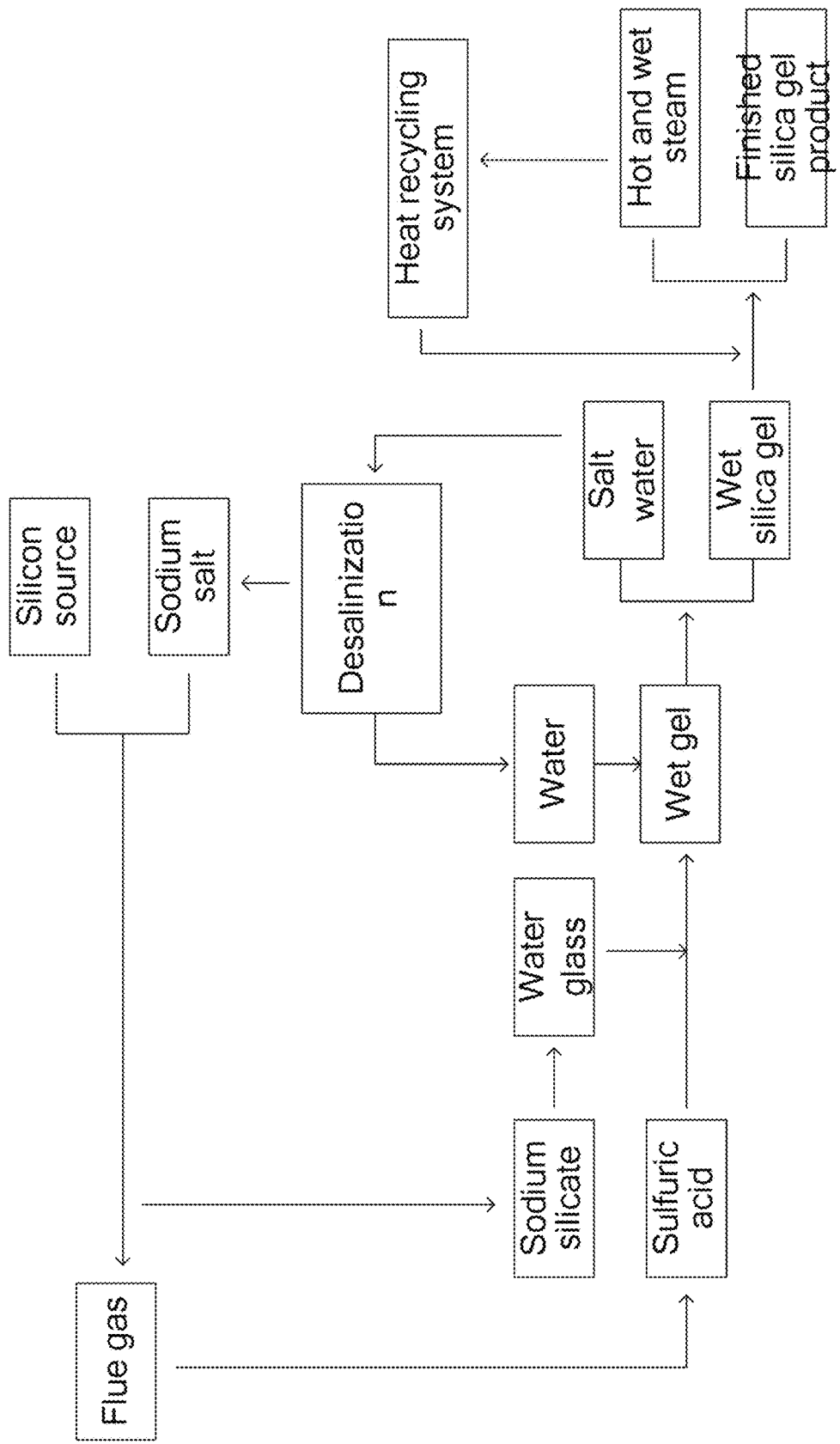
FIG. 6 is a schematic flow chart of the method for large-scale production of silica gel provided by the present disclosure.
Figure 7:
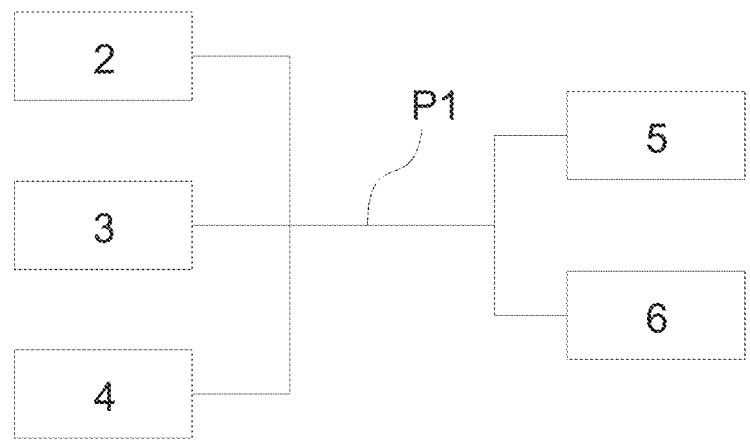
FIG. 7 shows that each of the dryers is connected to the compressor and the heat exchanger through a first pipeline.
Figure 8:
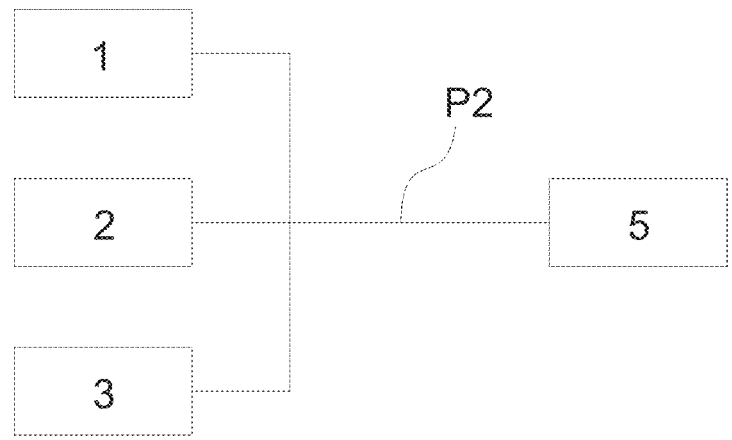
FIG. 8 shows each of the preheating conveyor belt, the first dryer and the second dryer is connected to the first compressor through a second pipeline.
Figure 9:
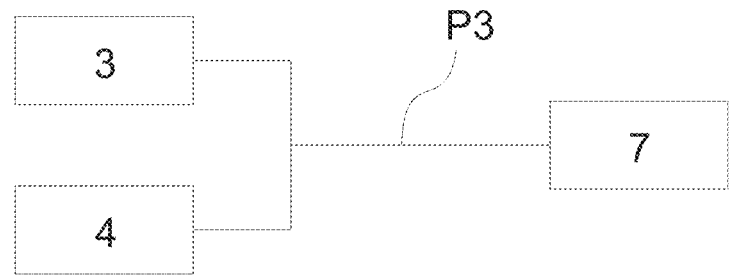
FIG. 9 shows that each of the second dryer and the third dryer is connected to the first heat exchanger through a third pipeline.
Figure 10:
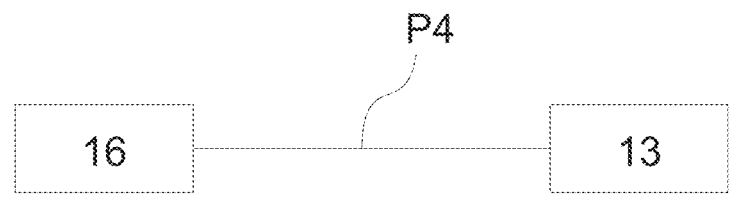
FIG. 10 shows that the second heat pump is connected to the water-washing device through a fourth pipeline.
Figure 11:
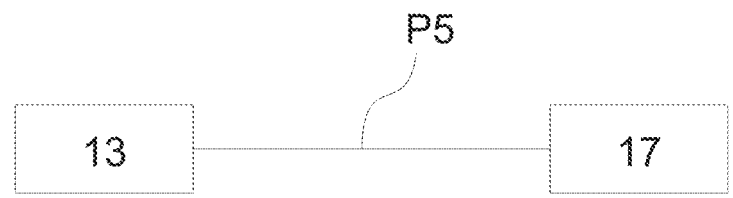
FIG. 11 shows that the water-washing device is connected to the mixing heater through a fifth pipeline.

As shown in FIG. 6, based on the same inventive concept, the present disclosure also provides a method for large-scale production of silica gel. The method adopts the efficient and energy-saving process for recycling waste heat of production described above and includes the following steps:

S1: A silicon source, a sodium salt, and a sulfur-containing fuel in a specified ratio are subjected to a reaction at a reaction temperature of 1,350° C. to 1,400° C. in a reverberatory furnace to produce sodium silicate and a sulfur dioxide-rich flue gas.

S2: Sulfur is added, an appropriate amount of air is introduced, and combustion is conducted to obtain a flue gas with a specified sulfur dioxide concentration. Specifically: The sulfur dioxide-rich flue gas obtained in the step S1 is allowed to enter a waste heat boiler. Sulfur is added to a sulfur-burning furnace, an appropriate amount of air is introduced, combustion is conducted at about 1,000° C. to produce a sulfur dioxide flue gas, and the sulfur dioxide flue gas is allowed to enter the waste heat boiler. After undergoing heat recovery by the waste heat boiler, flue gases at outlets of a reverberatory furnace and the sulfur-burning furnace are cooled to 230° C. to 250° C. and have a sulfur dioxide volume fraction of 5.6% or more. Flue gases produced after the heat recovery are allowed to enter an acid-washing and purification section such that dust in the flue gases is removed and the flue gases are cooled to 35° C. or lower, dried and dehydrated with concentrated sulfuric acid, and then allowed to enter a converter and converted with a vanadium catalyst to produce sulfur trioxide. Finally, the sulfur trioxide is absorbed with concentrated sulfuric acid having a mass fraction of 98% in an absorption tower at 60° C. to obtain industrial-grade sulfuric acid.

In the prior art, a concentration of sulfur dioxide needs to be controlled to eliminate a tail gas, and a desulfurization treatment is conducted by alkali liquor absorption, catalysis, and ammonia water absorption. However, a desulfurization efficiency is not high, an input is not proportional to an output economically, and a concentration of sulfur dioxide after the treatment is far from an emission standard. In the present disclosure, a contrary method to the prior art is adopted, that is, sulfur is added to treat a tail gas of sulfur dioxide on one hand and prepare sulfuric acid on the other hand. Although the preparation of sulfuric acid with a tail gas of sulfur dioxide has been disclosed in the prior art, in order to ensure a quality of a sulfuric acid product, an air separation device of oxygen-fuel combustion is adopted. As a result, there are a large floor space and a high cost, and a cost of oxygen-fuel combustion also does not meet an actual production demand and theoretically cannot be converted into productivity, which is not conducive to large-scale industrial production. In addition, the flue gases are cooled to 230° C. to 250° C. to guarantee a safe operation of sulfuric acid preparation. If the temperature is higher than 250° C., it will increase the burden on the subsequent transmission pipelines and sulfuric acid purification devices. If the temperature is lower than 230° C., sulfurous acid will be produced during sulfuric acid preparation. If the temperature is lower than an acid dew point temperature of the flue gas, a device will be corroded and there will be hidden dangers in the operation of a device.

S3: The sodium silicate produced in the step S1 and the sulfuric acid produced in the step S2 are subjected to solution preparation, gelatinization, aging, cutting, water-washing and drying to produce dry silica gel. During a silica gel drying process, heat of a hot and wet steam is recycled for drying a material by the system for recycling waste heat of production described above.

Preferably, the method further includes a flue-gas heat recycling step: High-temperature flue gases produced by the reverberatory furnace in the step S1 and the sulfur-burning furnace in the step S2 are allowed to enter the waste heat boiler such that heat in the high-temperature flue gases is recovered by the waste heat boiler to produce medium-temperature flue gases, and the medium-temperature flue gases are allowed to enter the second heat exchanger to undergo a heat exchange. Flue-gas heat discharged by the second heat exchanger is recovered by the first heat pump. One part of the flue-gas heat is used to heat tap water for water-washing. The other part of the flue-gas heat is used to heat room-temperature air to produce medium-temperature air, and the medium-temperature air enters the second heat exchanger to undergo a heat exchange with a medium-temperature flue gas to produce a low-temperature flue gas and high-temperature air. The low-temperature flue gas enters the first heat pump and is further cooled to produce a low-temperature flue gas, and the high-temperature air is used for combustion-supporting in the reverberatory furnace and the sulfur-burning furnace.

Preferably, the method further includes a first wastewater heat recycling step: Heat resulting from concentrated sulfuric acid dilution and sodium silicate dissolution is recovered by the cooler during the gelatinization in the step S3 to heat tap water and frozen crystal water for water-washing.

Preferably, the method further includes a second wastewater heat recycling step: Sodium sulfate-containing water produced during water-washing procedure in the step S3 flows through the second heat pump, such that wastewater heat discharged during the water-washing is further recovered by the second heat pump.

Preferably, the method further includes a third wastewater heat recycling step: During the drying in the step S3, condensate water produced by the first dryer and the second dryer is used for water-washing or heat supply.

Preferably, the silicon source in the step S1 is selected from any of the following: (a1) quartz sand; (a2) dry silica gel powder produced during a dry silica gel production procedure; (a3) wet silica gel powder produced during an aging and cutting procedure; (a4) an alkali sludge resulting from filtration and precipitation during solution preparation of the sodium silicate; and (a5) a polysilicon residue.

Preferably, the sodium salt in the step S1 is selected from any of the following: (b1) sodium sulfate decahydrate produced after desalination of sodium sulfate-containing water during a water-washing procedure; (b2) anhydrous sodium sulfate produced after the desalination of the sodium sulfate-containing water during the water-washing procedure; (b3) a sulfur-containing solid-waste sodium salt: sodium thiosulfate, sodium thiocyanate, and sodium sulfite; and (b4) a water-quenching solution produced in a water-quenching tank during a sodium silicate production procedure. More preferably, the sodium salt in the step S1 is selected from any of the following two: (b1) the sodium sulfate decahydrate produced after the desalination of the sodium sulfate-containing water during the water-washing procedure; and (b2) the anhydrous sodium sulfate produced after the desalination of the sodium sulfate-containing water during the water-washing procedure.

Preferably, water adopted for the water-washing procedure in the step S3 is selected from any one or more of the following: (c1) wastewater produced after the water-washing and treated; (c2) water produced after condensation of a steam produced during the silica gel drying process; (c3) condensate water produced by the sulfur-burning furnace and the waste heat boiler; (c4) cooled water produced by the sulfur-burning furnace and the waste heat boiler in the step S1; (c5) cooling water produced during solution preparation of the sulfuric acid; and (c6) aging water produced during an aging and cutting procedure.

Preferably, the sulfur-containing fuel in the step S1 is high-sulfur coal or high-sulfur petroleum coke powder. In the prior art, the use of the high-sulfur coal or the high-sulfur petroleum coke powder is faced with many problems: After combustion of the high-sulfur coal or the high-sulfur petroleum coke powder, $SO_2$ or $SO_3$ is generated and very easily undergoes a chemical combination with a water vapor to produce a sulfuric acid steam, which corrodes a combustion device heavily and results in high requirements for the device. When emitted into the air, the produced $SO_2$ or $SO_3$ causes heavy pollution to the atmospheric environment. The high-sulfur coal or the high-sulfur petroleum coke powder is prone to spontaneous combustion and deterioration during storage, which affects a combustion effect. Therefore, the high-sulfur coal or the high-sulfur petroleum coke powder is rarely used in production due to the above problems. In the present application, in addition to serve as a fuel, the high-sulfur coal or the high-sulfur petroleum coke powder can provide sulfur to increase a concentration of sulfur dioxide to prepare sulfuric acid. Due to the limitation of a temperature, sulfur dioxide will not have an impact on the corrosion of devices, and also will not be discharged as a tail gas to pollute the environment, which improves a utilization value of waste resources.

Example 1

In this example, an efficient and energy-saving system for recycling waste heat of production is provided, including wet-steam waste-heat recycling module R-4 configured to recycle heat of a hot and wet steam produced during a drying process of silica gel.

As shown in FIG. 1, the wet-steam waste-heat recycling module (R-4) specifically includes preheating conveyor belt 1, first dryer 2, second dryer 3, third dryer 4, first compressor 5, and first heat exchanger 6. The preheating conveyor belt 1 passes through the first dryer 2, the second dryer 3 and the third dryer 4 in sequence, each of the preheating conveyor belt 1, the first dryer 2 and the second dryer 3 is connected to the first compressor 5 through a pipeline, and each of the second dryer 3 and the third dryer 4 is connected to the first heat exchanger 6 through a pipeline. In this example, specifically, the first dryer 2 is a vertical dryer, the second dryer 3 is a mesh belt dryer, and the third dryer 4 is an air-cooling dryer. The first compressor 5 is a steam-recompression compressor. The first heat exchanger 6 is a gas-to-gas heat exchanger.

As shown in FIG. 2, the efficient and energy-saving system for recycling waste heat of production further includes flue-gas waste-heat recycling module R-1 configured to recycle heat of a high-temperature flue gas produced during the production. The flue-gas waste-heat recycling module R-1 includes waste heat boiler 7, second heat exchanger 8, and first heat pump 9. A flue-gas inlet end of the waste heat boiler 7 is connected to reverberatory furnace 10 and sulfur-burning furnace 12 that produce the high-temperature flue gas. A flue-gas outlet end of the waste heat boiler 7 is connected to a medium-temperature flue-gas inlet end of the second heat exchanger 8. A high-temperature air outlet end of the second heat exchanger 8 is connected to the reverberatory furnace 10 and the sulfur-burning furnace 12, respectively. A medium-temperature flue-gas outlet end of the second heat exchanger 8 is connected to the first heat pump 9. The first heat pump 9 is externally connected to room-temperature air and tap water. A medium-temperature air outlet end of the first heat pump 9 is connected to the second heat exchanger 8. In this example, preferably, the second heat exchanger 8 is a gas-to-gas heat exchanger.

As shown in FIG. 3, the efficient and energy-saving system for recycling waste heat of production further includes first wastewater waste-heat recycling module R-2 configured to recycle heat generated during a raw material preparation process. The first wastewater waste-heat recycling module R-2 includes a cooler, and tap water or wastewater of a salt recovery device flows through the cooler for heating and then flows to water-washing device 13. The cooler includes acid cooler 15 and alkali cooler 14. The acid cooler 15 can cool diluted high-temperature dilute sulfuric acid to a low temperature and use corresponding heat to heat tap water or cooling water. The alkali cooler 14 can cool high-temperature liquid sodium silicate to a low temperature and use corresponding heat to heat tap water or cooling water. Tap water or cooling water heated by the acid cooler 15 and the alkali cooler 14 can be used for water-washing of silica gel.

As shown in FIG. 4, the efficient and energy-saving system for recycling waste heat of production further includes second wastewater waste-heat recycling module R-3 configured to recycle heat generated during a salt recovery process. The second wastewater waste-heat recycling module R-3 includes second heat pump 16 and mixing heater 17. The second heat pump 16 is connected to the water-washing device 13 through a pipeline, and the water-washing device 13 is connected to the mixing heater 17 through a pipeline. Wastewater produced by the water-washing device 13 is cooled by the heat pump and then flows to the salt recovery device. High-temperature wastewater of the salt recovery device, condensate water resulting from silica gel drying, and a steam produced by the waste heat boiler 7 are mixed in the mixing heater 17 to undergo a heat exchange, and then flow to the water-washing device 13. In this example, preferably, the mixing heater 17 is a steam-water mixing heater.

As shown in FIG. 5, the efficient and energy-saving system for recycling waste heat of production further includes third wastewater waste-heat recycling module R-5 configured to recycle heat generated during a silica gel drying process.

Example 2

The present disclosure provides an efficient and energy-saving process for recycling waste heat of production. The process adopts the system for recycling waste heat of production described in Example 1 for heat recycling, and includes the following procedure:

A hot-and-wet steam heat recycling procedure: Wet silica gel is placed on the conveyor belt and conveyed by the conveyor belt to pass through the plurality of dryers in sequence, such that the wet silica gel is dried by the plurality of dryers to produce dry silica gel. Each of the conveyor belt and the dryers is connected to the compressor and/or the heat exchanger through a pipeline, and the hot and wet steam generated by the compressor and/or the heat exchanger is reused for drying the wet silica gel. Preferably, wet silica gel is placed on the preheating conveyor belt 1, and is conveyed by the preheating conveyor belt 1 to the first dryer 2 such that the silica gel is dried by the first dryer 2, then to the second dryer 3 such that the silica gel is further dried by the second dryer 3, and then to the third dryer 4 such that the silica gel is further dried by the third dryer 4 to produce dry silica gel. The first compressor 5 compresses a medium/low-temperature hot and wet steam produced by the preheating conveyor belt 1, the first dryer 2, the second dryer 3, and the third dryer 4 to produce a high-temperature hot and wet steam. One part of the high-temperature hot and wet steam is delivered to the first dryer 2 for silica gel drying and the other part of the high-temperature hot and wet steam is delivered to the first heat exchanger 6 to undergo a heat exchange with air and then delivered to the second dryer 3 for silica gel drying. A high-temperature hot and wet steam produced by the third dryer 4 is delivered to the preheating conveyor belt 1 for silica gel drying.

Specifically: The preheating conveyor belt carries wet silica gel with a temperature of 40° C. to 60° C. and a water content of 78%. Because the preheating conveyor belt 1 has a heating effect and can play a specified drying role for the silica gel, a medium/low-temperature hot and wet steam with a temperature of 50° C. to 70° C. and a relative humidity of greater than 90% is produced and enters the first compressor 5 for compression and heating, and the wet silica gel is dried from a water content of 78% to a water content of 76% and then enters the first dryer 2. Because the first dryer 2 is a vertical dryer, the silica gel moves vertically downwards in the first dryer 2 due to a weight of the silica gel itself. When falling, the silica gel is heated by a heating surface through which the silica gel passes, such that water in the silica gel is vaporized to allow first-stage silica gel drying and a medium/low-temperature hot and wet steam with a temperature of 60° C. to 80° C. and a water vapor content of 0% to 100% is produced and enters the first compressor 5 for compression and heating. Silica gel with a temperature of 80° C. to 100° C. and a water content of 60% produced after the drying by the first dryer 2 enters the second dryer 3. The second dryer 3 is a drying device that adopts a steel mesh as a conveyor belt to carry silica gel for continuous drying, and the silica gel is evenly spread on a mesh belt by a feeder and driven by a driving device to move in the second dryer 3. The second dryer 3 includes a plurality of units. A hot steam passes through silica gel spread on the mesh belt from bottom to top or from top to bottom for heat-drying to take away water. The mesh belt moves slowly, and a movement speed can be freely adjusted according to a temperature of silica gel. Dried silica gel continuously falls into a receiver, so as to allow two-stage silica gel drying. In this process, a medium/low-temperature hot and wet steam with a temperature of 80° C. to 100° C. and a relative humidity of greater than 90% is produced and enters the first compressor 5 for compression and heating. Silica gel with a temperature of 120° C. to 140° C. and a water content of 5% produced after the drying by the second dryer 3 enters the third dryer 4, and the third dryer 4 cools the silica gel with room-temperature air to recover heat and reduce a temperature of the silica gel, which facilitates the subsequent packaging of a dry silica gel product and allows three-stage silica gel drying. In addition, air with a temperature of 20° C. and a relative humidity of 70% is supplied to the third dryer 4. Since the third dryer 4 is an air-cooling dryer, hot air with a temperature of 100° C. and a relative humidity of 1.6% produced by the third dryer 4 is reused for drying of silica gel on the preheating conveyor belt 1. The medium/low-temperature hot and wet steam with a temperature of 50° C. to 70° C. and a relative humidity of greater than 90% produced by the preheating conveyor belt 1, the medium/low-temperature hot and wet steam with a temperature of 60° C. to 80° C. and a water vapor content of 0% to 100% produced by the first dryer 2, and the medium/low-temperature hot and wet steam with a temperature of 80° C. to 100° C. and a relative humidity of greater than 90% produced by the second dryer 2 enter the first compressor 5 for compression and heating to produce a high-temperature hot and wet steam with a temperature of higher than 100° C. and a water vapor content of 0% to 100%, and the high-temperature hot and wet steam is subjected to a heat exchange with a steam having a temperature of 160° C. that is supplied. In the present disclosure, the steam having the temperature of 160° C. can come from the waste heat boiler 7. After the heat exchange, a high-temperature hot and wet steam with a temperature of higher than 120° C. is produced. One part of the high-temperature hot and wet steam is reused for silica gel drying in the first dryer 2, and the other part of the high-temperature hot and wet steam enters the first heat exchanger 6. The high-temperature hot and wet steam with a temperature of higher than 120° C. that enters the first heat exchanger 6 is subjected to a heat exchange with room-temperature air having a temperature of 20° C. and a relative humidity of 70% that is supplied to produce a high-temperature hot and wet steam with a temperature of higher than 100° C. and a relative humidity of less than 2%, and the high-temperature hot and wet steam is reused for silica gel drying in the second dryer 3.

A flue-gas heat recycling procedure: A high-temperature flue gas with a temperature of about 1,000° C. is produced by the reverberatory furnace 10 and the sulfur-burning furnace 12 and enters the waste heat boiler 7, heat in the high-temperature flue gas is recovered by the waste heat boiler 7 to produce a medium-temperature flue gas with a temperature of 250° C., and then the medium-temperature flue gas enters the second heat exchanger 8 to undergo a heat exchange. Flue-gas heat discharged by the second heat exchanger 8 is recovered by the first heat pump 9. One part of the flue-gas heat is used to heat tap water for water-washing and the other part of the flue-gas heat is used to heat room-temperature air of 20° C. to produce medium-temperature air of 80° C. The medium-temperature air of 80° C. enters the second heat exchanger 8 to undergo a heat exchange with a medium-temperature flue gas of 250° C. to produce a flue gas with a reduced temperature of 60° C. and high-temperature air of 230° C. The flue gas with the reduced temperature of 60° C. enters the first heat pump 9 and is further cooled to produce a low-temperature flue gas of 15° C., and the high-temperature air of 230° C. is used for combustion-supporting in the reverberatory furnace 10 and the sulfur-burning furnace 12.

A first wastewater heat recycling procedure: The cooler includes acid cooler 15 configured to dilute concentrated sulfuric acid with a concentration of greater than 92.5% into dilute sulfuric acid with a concentration of 20% to 35% and alkali cooler 15 configured to dissolve solid sodium silicate. A large amount of heat is produced during the dilution or dissolution of the concentrated sulfuric acid and the solid sodium silicate before gelatinization. The acid cooler 15 cools diluted high-temperature dilute sulfuric acid to a low temperature and uses corresponding heat to heat tap water with a temperature of 20° C. or frozen crystal water with a temperature of 0° C. to 2° C. to produce water with a temperature of 35° C., and the water with the temperature of 35° C. is heated to a process temperature required by water-washing and then used for water-washing. The alkali cooler 14 cools high-temperature liquid sodium silicate to a low temperature and uses corresponding heat to heat tap water with a temperature of 20° C. or frozen crystal water with a temperature of 0° C. to 2° C. to produce water with a temperature of 35° C., and the water with the temperature of 35° C. is heated to a process temperature required by water-washing and then used for water-washing.

A second wastewater heat recycling procedure: Sodium sulfate-containing water produced during water-washing flows through the second heat pump 16, such that wastewater heat with a temperature of 35° C. to 45° C. discharged during the water-washing is further recovered by the second heat pump 16. Wastewater with a temperature of 10° C. to 20° C. produced after heat recovery is subjected to membrane concentration and desalination, and different desalination modes are adopted according to different seasons. In spring, summer, and autumn, the MVR mode is adopted. The MVR mode is adopted to subject a high-concentration salt solution produced after membrane concentration to evaporation and concentration to obtain sodium sulfate. In winter, the freezing crystallization mode is adopted. The freezing crystallization mode is adopted to crystallize sodium sulfate in a high-concentration salt solution produced after membrane concentration. The mixing heater mixes low-temperature tap water, pure water, condensate water, or the like with a steam of 160° C. for heating to a temperature required by water-washing. In the present disclosure, the steam of 160° C. comes from the waste heat boiler 7. One part of the steam of 160° C. is used for the second wastewater heat recycling procedure, and the other part of the steam of 160° C. is used for steam supply in the hot-and-wet steam heat recycling procedure.

A third wastewater heat recycling procedure: The first dryer 2 produces condensate water with a temperature of 60° C. to 80° C., and the second dryer 3 produces condensate water with a temperature of 80° C. to 100° C. The above two types of condensate water are collected. One part of collected condensate water can be reused for water-washing in the water-washing device 13, and the other part of collected condensate water can be used for heat supply.

According to calculations based on an annual production capacity of 300,000 tons for silica gel, the wet-steam waste-heat recycling module can recycle 2800,000 GJ of heat, the flue-gas waste-heat recycling module can recycle 3,000,000 GJ of heat, the first wastewater waste-heat recycling module can recycle 195,000 GJ of heat, the second wastewater waste-heat recycling module can recycle 435,000 GJ of heat, and the third wastewater waste-heat recycling module can recycle 415,000 GJ of heat.

Example 3

In this example, a method for large-scale production of silica gel is also provided, as shown in FIG. 6, specifically including the following steps:

S1: In this example, a silicon source was quartz sand, a sodium salt was anhydrous sodium sulfate produced after desalination of sodium sulfate-containing water during a water-washing procedure, and a sulfur-containing fuel was a high-sulfur coal in which a mass percentage of sulfur was 8%. The silicon source, the sodium salt, and the sulfur-containing fuel were mixed in 7:4.3:2 in a regenerative reverberatory furnace, a resulting mixture was allowed to stay in the furnace for 4 h with a furnace temperature of 1,400° C., and a resulting sodium silicate molten salt was allowed to overflow through a discharge port and cooled by water-quenching tank 11, so as to obtain sodium silicate with a modulus of 3.2 and a water-insoluble matter mass fraction of 1.64% and a flue gas with a sulfur dioxide volume fraction of 2.17%.

S2: The sulfur dioxide-rich flue gas obtained in the step S1 was allowed to enter the waste heat boiler 7. 45 kg of molten sulfur was sprayed by a liquid sulfur spray gun into the sulfur-burning furnace 12 per 1,000 m$^3$ of a flue gas, an appropriate amount of air was introduced, combustion was conducted at about 1,000° C. to produce a sulfur dioxide flue gas, and the sulfur dioxide flue gas was also allowed to enter the waste heat boiler 7. After flue gases with a high temperature of about 1,000° C. at outlets of the sulfur-burning furnace 12 and the reverberatory furnace 10 undergo heat recovery by the waste heat boiler 7, the flue gases were cooled to 230° C. to 250° C. and preferably the flue gases with a high temperature of about 1,000° C. were cooled to produce medium-temperature flue gases of 250° C., and a sulfur dioxide volume fraction in the flue gases reached 5.6%. Flue gases produced after the heat recovery were allowed to enter an acid-washing and purification section such that dust in the flue gases was removed and the flue gases were cooled by the gas-to-gas heat exchanger to produce low-temperature flue gases with a temperature of 35° C. or lower and preferably 15° C., and the low-temperature flue gases were dried and dehydrated with concentrated sulfuric acid, and then allowed to enter a converter and converted with a vanadium catalyst to produce sulfur trioxide. Finally, the sulfur trioxide was absorbed with concentrated sulfuric acid having a mass fraction of 98% in an absorption tower at 60° C. to obtain industrial-grade sulfuric acid. The industrial-grade sulfuric acid had a concentration of higher than 92.5%, and was in line with a qualified product specified in GB/T 534-2014.

S3: The sodium silicate produced in the step S1 and the sulfuric acid produced in the step S2 were subjected to solution preparation, gelatinization, aging, cutting, water-washing and drying to produce dry silica gel. Specifically, water adopted for the water-washing procedure in the step S3 was wastewater produced after the water-washing and treated.

The method for large-scale production of silica gel provided in this example further includes use of the efficient and energy-saving process for recycling waste heat of production in Example 2, and specifically includes a hot-and-wet steam heat recycling procedure, a flue-gas heat recycling procedure, a first wastewater heat recycling procedure, a second wastewater heat recycling procedure, and a third wastewater heat recycling procedure.

Silica gel meeting the index requirements in the silica gel industry standard HG/T2765.1-2765.6-2005 can be produced through this example.

The method for large-scale production of silica gel provided in this example allows the formation of an eco-friendly cycle during silica gel production, does not involve the emission of the "three wastes" (waste gas, waste water, and waste residues), allows the circulation of sulfur, sodium and silicon and the circulation of water resources and heat resources, is efficient and energy-saving, and is suitable for large-scale industrial production.

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. An energy-saving system for recycling waste heat of production,
   comprising a wet-steam waste-heat recycling module configured to recycle heat of a hot and wet steam produced during a drying process of a material, wherein the wet-steam waste-heat recycling module comprises a conveyor belt configured to carry the material, a plurality of dryers, a compressor, and a heat exchanger, wherein the conveyor belt passes through the plurality of dryers in sequence, each of the plurality of dryers is connected to the compressor and the heat exchanger through a first pipeline, and the hot and wet steam produced by the compressor and the heat exchanger is reused for drying the material; and
   the wet-steam waste-heat recycling module specifically comprises a preheating conveyor belt, a first dryer, a second dryer, a third dryer, a first compressor, and a first heat exchanger, wherein the preheating conveyor belt passes through the first dryer, the second dryer and the third dryer in sequence, each of the preheating conveyor belt, the first dryer and the second dryer is connected to the first compressor through a second pipeline, and each of the second dryer and the third dryer is connected to the first heat exchanger through a third pipeline; and the material is silica gel.

2. The energy-saving system for recycling waste heat of production according to claim 1, further comprising a flue-gas waste-heat recycling module configured to recycle heat of a high-temperature flue gas produced during the production, wherein the flue-gas waste-heat recycling module comprises a waste heat boiler, a second heat exchanger, and a first heat pump; a flue-gas inlet end of the waste heat boiler is connected to a reverberatory furnace and a sulfur-burning furnace, wherein the reverberatory furnace and the sulfur-burning furnace produce the high-temperature flue gas; a flue-gas outlet end of the waste heat boiler is connected to a medium-temperature flue-gas inlet end of the second heat exchanger; a high-temperature air outlet end of the second heat exchanger is connected to the reverberatory furnace and the sulfur-burning furnace, respectively; a flue-gas outlet end of the second heat exchanger is connected to the first heat pump; the first heat pump is externally connected to room-temperature air and tap water; and a medium-temperature air outlet end of the first heat pump is connected to the second heat exchanger.

3. The energy-saving system for recycling waste heat of production according to claim 1, further comprising a first wastewater waste-heat recycling module configured to recycle heat generated during a raw material preparation process, wherein the first wastewater waste-heat recycling module comprises a cooler, and tap water or wastewater of a salt recovery device flows through the cooler for heating and then flows to a water-washing device.

4. The energy-saving system for recycling waste heat of production according to claim 3, further comprising a second wastewater waste-heat recycling module configured to recycle heat generated during a salt recovery process, wherein the second wastewater waste-heat recycling module comprises a second heat pump and a mixing heater; and the second heat pump is connected to the water-washing device through a fourth pipeline, and the water-washing device is connected to the mixing heater through a fifth pipeline.

5. The energy-saving system for recycling waste heat of production according to claim 4, further comprising a third wastewater waste-heat recycling module configured to recycle heat generated during a silica gel drying process.

6. An energy-saving process for recycling waste heat of production, wherein the efficient and energy-saving process adopts the efficient and energy-saving system for recycling waste heat of production according to claim 1 for heat recycling, and comprises the following procedure:
a hot-and-wet steam heat recycling procedure: placing a wet material on the conveyor belt, and conveying the wet material by the conveyor belt to pass through the plurality of dryers in sequence, such that the wet material is dried by the plurality of dryers to produce a dry material; and connecting the conveyor belt and the plurality of dryers to the compressor and the heat exchanger through a fourth pipeline, and reusing the hot and wet steam generated by the compressor and the heat exchanger for drying the wet material.

7. A method for large-scale production of silica gel, comprising the following steps:
S1: subjecting a silicon source, a sodium salt, and a sulfur-containing fuel in a predetermined ratio to a reaction at a predetermined reaction temperature to produce sodium silicate and a sulfur dioxide-rich flue gas;
S2: allowing the sulfur dioxide-rich flue gas obtained in the step S1 to enter a waste heat boiler; adding sulfur to a sulfur-burning furnace, introducing an appropriate amount of air, conducting combustion at about 1,000° C. to produce a sulfur dioxide flue gas, and allowing the sulfur dioxide flue gas to enter the waste heat boiler, wherein after undergoing heat recovery by the waste heat boiler, flue gases at outlets of a reverberatory furnace and the sulfur-burning furnace are cooled to 230° C. to 250° C. and have a sulfur dioxide volume fraction of 5.6% or more; allowing flue gases produced after the heat recovery to enter an acid-washing and purification section for purification and drying, and then to enter a converter for catalytic conversion to produce sulfur trioxide; and finally absorbing the sulfur trioxide with concentrated sulfuric acid to obtain industrial-grade sulfuric acid; and
S3: subjecting the sodium silicate produced in the step S1 and the sulfuric acid produced in the step S2 to solution preparation, gelatinization, aging, cutting, water-washing and drying to produce dry silica gel, wherein during a silica gel drying process, heat of a wet steam is recycled for drying a material by the energy-saving system for recycling waste heat of production according to claim 1.

8. The method for large-scale production of silica gel according to claim 7, wherein the silicon source in the step S1 is selected from any of the following: (a1) quartz sand; (a2) dry silica gel powder produced during a dry silica gel production procedure in the step S3; (a3) wet silica gel powder produced during an aging and cutting procedure in the step S3; (a4) an alkali sludge resulting from filtration and precipitation during solution preparation of the sodium silicate in the step S3; and (a5) a polysilicon residue.

9. The method for large-scale production of silica gel according to claim 7, wherein the sodium salt in the step S1 is selected from any of the following: (b1) sodium sulfate decahydrate produced after desalination of sodium sulfate-containing water during a water-washing procedure in the step S3; (b2) anhydrous sodium sulfate produced after the desalination of the sodium sulfate-containing water during the water-washing procedure in the step S3; (b3) a sulfur-containing solid-waste sodium salt: sodium thiosulfate, sodium thiocyanate, and sodium sulfite; and (b4) a water-quenching solution produced in a water-quenching tank during a sodium silicate production procedure in the step S1.

10. The method for large-scale production of silica gel according to claim 7, wherein water adopted for the water-washing procedure in the step S3 is selected from any one or more of the following: (c1) wastewater produced after the water-washing and treated; (c2) water produced after condensation of a steam produced during the silica gel drying process in the step S3; (c3) condensate water produced by the sulfur-burning furnace and the waste heat boiler in the step S2; (c4) cooled water produced by the sulfur-burning furnace and the waste heat boiler in the step S2; (c5) cooling water produced during solution preparation of the sulfuric acid in the step S3; and (c6) aging water produced during an aging and cutting procedure in the step S3.

11. The method for large-scale production of silica gel according to claim 7, wherein the sulfur-containing fuel in the step S1 is high-sulfur coal or high-sulfur petroleum coke powder.

* * * * *